Patented Feb. 12, 1952

2,585,015

UNITED STATES PATENT OFFICE 2,585,015

PROCESS FOR THE TREATMENT OF EGG WHITES

Arthur M. Kaplan, Hyattsville, Md., and Mathilde Solowey, Washington, D. C., assignors to the United States of America as represented by the Secretary of Agriculture No Drawing. Application May 22, 1950,
Serial No. 163,574

14 Claims. (Cl. 99—113)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This application is a continuation in part of our copending application Serial No. 126,261 filed November 8, 1949, the disclosure of which is incorporated herein by reference.

This invention relates to the manufacture of dried egg whites, and more particularly to methods of thinning liquid egg white and of removal of sugar components thereof by nonproliferating cell fermentation.

In the production of commercial dried egg whites, that is, dried egg albumen, it is common practice to thin liquid egg white by fermentation with microorganisms either naturally present therein or introduced by inoculation with suitable microbiological cultures. The activity of these microorganism in the course of the fermentation process causes elimination of the sugar present in the egg white and results in a separation of the insoluble constituents from the liquid albumen fraction, which can then be readily segregated for subsequent processing and drying.

The yield as well as the quality of dried egg albumen derived from egg whites thinned by natural fermentation very greatly, and the products so obtained frequently possess an objectionable odor and flavor. Egg whites subjected to controlled fermentation also tend to yield dried egg albumen of varying quality due to contamination of the mother cultures used as inocula, or to the failure to suppress in the course of the fermentation the detrimental action of deleterious microorganisms accidentally present in the egg white, since generally in the fermentation of egg whites by previously proposed procedures the number of microorganisms initially present therein, as well as of those added by inoculation, increases as the sugar is utilized and fermentation proceeds to completion. It has also been found that under certain conditions addition of starter cultures induces a stimulated growth of microorganism accidentally present in the egg white which frequently causes the development of objectionable odors and flavors.

By increasing the size of the inoculum, when using any suitable microorganisms capable of producing acid from sugar, it is possible to decrease the length of time necessary to bring the fermentation process to completion from the usual 48–72 hours to a period of about 21–24 hours. However, under these conditions also, the detrimental activity of microorganisms initially present in the egg white is not always impeded. Furthermore, the preparation of starter or mother cultures is a laborious, time consuming and exacting task, and since it is impracticable to prepare pure mother cultures of liquid egg white on a large scale under commercial conditions, the use of large inocula results in adulteration of the fermented egg whites with the other media used to culture the microorganisms that bring about the fermentation.

We have found that the disadvantages inherent in the methods heretofore proposed are obviated and complete fermentation of egg whites is rapidly attained on effecting the process by means of microorganisms capable of producing acid from sugar, added as an inoculum in a nonproliferating stage.

According to the method of our invention, a concentrated microbial preparation of microorganisms capable of producing acid from sugar, such as Lactobacilli, Streptococci and Aerobacter is prepared by growing the organisms in a suitable liquid medium under optimum growing conditions and then recovering the microbial cells from the culture by any suitable procedure such as filtration or centrifugation. The resulting concentrated microbial preparations, as harvested, or in the form of suitable pastes, slurries or suspensions, are used as inocula for direct seeding of the egg whites to be fermented with desired concentration of the organisms, allowing the fermentation to proceed to completion under optimum conditions of pH, aeration and temperature, as required by the specific microorganisms employed.

We have found that on following this procedure complete fermentation is attained within a very short period, with no proliferation of the organisms introduced as an inoculum or of any organisms accidentally present in the egg white.

We have further found that certain acid-forming microorganisms, such as *Steptococcus lactis* which, when used in the form of broth culture inocula either do not ferment egg white or cause only a partial reduction of the sugar content thereof on prolonged incubation, are eminently well-adapted for use in accordance with the method of our invention and bring about a rapid and substantially complete fermentation of the reducing sugar of egg white over a relatively wide range of fermentation temperature and pH.

Upon completion of the fermentation as determined by the usual chemical tests, the insolubles are removed by gravity, skimming, centrifugal force, filtration under pressure or any other appropriate procedure and the fermented egg whites dried in a conventional manner. Our fermentation method causes no breakdown of the egg white protein by proteolysis, and since any microorganisms that may be accidentally present in the egg white do not multiply in the course of the fermentation process, the fermented liquid egg whites and the dried albumen obtained therefrom are free from objectionable off-flavor and odor. The final products thus obtained undergo no browning on subsequent storage at ordinary and elevated temperatures, while their appearance and properties are characteristic of the finest grade of edible dried egg albumen.

In the preparation of concentrated microbial preparations used as inocula in our process, the harvested cells can be utilized in the form of pastes, slurries or suspensions by combining them with liquid egg white, water, or any other non-toxic liquid which will not adulterate the egg whites or be harmful to the microorganisms. Such preparations can be stored until needed since we have found that they can be maintained at refrigerator temperatures for long periods with no significant decrease in viability. Thus our method obviates the necessity of constantly preparing mother cultures of fermenting egg white, and the hazards of contamination incidental thereto; it also precludes adulteration of egg whites with extraneous materials such as are present in culture media, or fermenting grains or vegetable masses used as inocula. Furthermore, the concentrated microbial preparations utilized as inocula in our process make it possible to seed the egg whites with concentrations of microorganisms that cannot be attained by using ordinary starter or mother cultures.

The following examples illustrate the invention.

EXAMPLE I

Two 100 milliliter portions of liquid egg white were adjusted to pH 6.7–6.8 with 1N lactic acid. One of these samples was inoculated with approximately 3 percent by weight on the basis of the liquid egg white, of a twenty-four hour broth culture of *Streptococcus lactis* (containing on the order of $3.0 \times 10^8$ organisms per milliliter). The other sample was inoculated with 1 percent by weight of a concentrated cell preparation obtained by centrifugation of 24 hour broth cultures of *Streptococcus lactis* using a Sharples Super Centrifuge, and containing on the order of $4.0 \times 10^{11}$ organisms per milliliter of packed cells. The samples were incubated at 37° C. and sugar and pH determinations made at suitable intervals.

The experimental data shown in Table 1 indicate that the fermentation process for the sample inoculated with the broth culture did not cause a depletion of the sugar in 72 hours, whereas the sample inoculated with the concentrated paste of *Streptococcus lactis* showed essentially complete utilization of the sugar in 3 hours.

Table 1

| Incubation Time, Hours | Course of fermentation | | | |
|---|---|---|---|---|
| | Broth Culture Inoculum | | Concentrated Cell Inoculum | |
| | pH | Glucose, percent | pH | Glucose, percent |
| 0 | 6.80 | .400 | 6.70 | .308 |
| 1 | | | 6.65 | .123 |
| 2 | | | 5.80 | .040 |
| 3 | | | 5.60 | .018 |
| 24 | 6.85 | .400 | | |
| 48 | 6.70 | .400 | | |
| 72 | 6.70 | .400 | | |

EXAMPLE II

Six 200 milliliter portions of liquid egg white were used. Two of these portions were adjusted to pH 7.0, two were adjusted to pH 7.5, while the remaining two portions were left unadjusted at pH 9.0. These samples were inoculated each with 1 percent by weight of concentrated *Streptococcus lactis* cells, harvested as described in Example I, added as a dispersion in an equal volume of 0.85 percent saline. The inoculated samples were divided into two sets, each comprising three samples of initial pH 7.0, 7.5 and 9.0 respectively. One set was incubated at 26°–28° C. and the other at 37° C. The course of fermentation was followed by making sugar and pH determinations at suitable intervals. The results so obtained shown in Table 2 indicate that the fermentation was essentially complete within 2–4 hours under all conditions of incubation temperature and initial pH employed.

Table 2

| Incubation Temperature | Time, Hours | Course of fermentation | | | | | |
|---|---|---|---|---|---|---|---|
| | | Initial pH 7.0 | | Initial pH 7.50 | | Initial pH 9.00 | |
| | | pH | Glucose, percent | pH | Glucose, percent | pH | Glucose, percent |
| 26°–28° C | 0 | 7.00 | .339 | 7.50 | .381 | 9.00 | .311 |
| | 1 | 6.40 | .221 | 7.00 | .208 | 8.05 | .231 |
| | 2 | 6.00 | .109 | 6.40 | .104 | 7.50 | .090 |
| | 3 | 5.60 | .023 | 5.95 | <.005 | 6.60 | .036 |
| | 4 | | | | | 6.50 | .008 |
| 37° C | 0 | 7.00 | .311 | 7.50 | .381 | 9.00 | .355 |
| | 1 | 6.30 | .147 | 6.30 | .133 | 7.15 | .163 |
| | 2 | 5.60 | <.005 | 6.00 | <.005 | 6.60 | <.005 |
| | 3 | 5.60 | <.005 | 6.00 | <.005 | 6.45 | <.005 |

EXAMPLE III

Seven liters of unadjusted egg white were inoculated with 78 grams of concentrated *Streptococcus lactis* cells, obtained as described in Example I, and incubated at 37° C. Sugar, pH, non-protein nitrogen (Hawk, Oser and Summerson: Practical Physiological Chemistry 12th ed., Blakiston & Co., Philadelphia, 1947), and formol nitrogen determinations were made at suitable intervals. The data shown in Table 3 indicate that no significant proteolysis occurred during the fermentation which was essentially complete within 2 hours.

Table 3

| Time, Hours | pH | Glucose, percent | N. P. N., mgm. percent | Formol Nitrogen, mgm. percent |
|---|---|---|---|---|
| 0 | 9.0 | .334 | 6.48 | 74.13 |
| 1 | 6.7 | .057 | | |
| 2 | 6.3 | .013 | 13.50 | 90.09 |

EXAMPLE IV

Three hundred milliliters of unadjusted liquid egg whites were inoculated with 1 percent by weight of concentrated *Streptococcus lactis* cells, obtained as described in Example I, and fermented at 37° C. Sugar and pH determinations and viable bacterial counts were made at suitable intervals during the fermentation. The data shown in Table 4 indicate that the fermentation, essentially complete within 1.5 hours, is caused with no proliferation of the bacterial cells.

Table 4

| Time, hours | Bacterial count, per milliliter | pH | Glucose, percent |
|---|---|---|---|
| 0 | $5.0 \times 10^9$ | 8.60 | .320 |
| 1 | $5.0 \times 10^9$ | 6.30 | .066 |
| 1.5 | $5.0 \times 10^9$ | 6.20 | .006 |

Similar results were obtained by analogous procedures on conducting the fermentation with concentrated *Streptococcus lactis* preparations, essentially as described in the foregoing examples, at temperatures from about 21° to about 37° C., using either unadjusted liquid egg white, or egg white acidified to an initial pH value up to about 6.7, either with lactic acid or with any other suitable acidifying agent such as hydrochloric, tartaric, or citric acid. The concentrated microbial cells preparation, which may contain, for example, on the order of $1.0 \times 10^{11}$ to $1.0 \times 10^{12}$ organisms per gram of concentrate, can also be recovered from broth cultures by filtration as described by Kaplan et al. (1946, J. Bact. 52, 513–517) and used as inocula either as such or admixed with liquid egg white, water, saline or any other nontoxic liquid in concentrations such as to give on inoculation a product containing on the order of $1.0 \times 10^9$ microorganisms per milliliter.

On the basis of the foregoing examples, it can be seen that through the use of our process a fermented egg white can be produced, using *Streptococcus lactis* in a non-proliferating state, having a pH range of 5.6–6.6 as desired. The final pH of the product varies with the initial pH thus enabling a product to be produced at varying pH values suitable for specific purposes. Thus, if a dried egg albumen is desired suitable for use in baking an angel food cake, or if a dried albumen is desired with a pH near neutrality, it is not necessary to adjust the pH of the egg white prior to fermentation and the fermentation can be carried out simply by inoculating the concentrated microbial suspension, slurry or paste directly into the unadjusted egg white.

Angel food cakes baked using dried egg albumen, produced from egg white fermented by *Streptococcus lactis* according to our process, have all the attributes of the finest qualities desired in such baked products.

We claim:

1. The method of fermenting liquid egg white by *Streptococcus lactis*, said microorganism being in a non-proliferating stage during the fermentation process.

2. The method of eliminating substantially all the sugar present in egg white which comprises subjecting liquid egg white to non-proliferating cell fermentation by *Streptococcus lactis*.

3. The method of fermenting liquid egg white which comprises inoculating the egg white with a concentrated cell preparation of *Streptococcus lactis* in an amount sufficient to cause on subsequent incubation of the inoculated material a substantially complete utilization of the sugar content of egg white by the microorganism of the inoculum in a non-proliferating stage.

4. The process comprising cultivating *Streptococcus lactis* in a liquid medium, recovering the microbial cells from the resulting culture in the form of a concentrate, inoculating liquid egg white with the concentrate and allowing the inoculated egg white to undergo non-proliferating cell fermentation.

5. The process of claim 4 wherein the liquid egg white is inoculated at a pH within the range from 6.7 to about 9.0.

6. The process of claim 4 wherein the inoculation of the liquid egg white is effected by addition of microbial cells of *Streptococcus lactis* in admixture with a nontoxic liquid.

7. A process comprising cultivating *Streptococcus lactis* in a liquid medium, recovering the microbial cells from the resulting culture in the concentrate containing on the order of $1.0 \times 10^{11}$ to $1.0 \times 10^{12}$ organisms per gram of the concentrate and inoculating liquid egg white with the organisms thus obtained in an amount sufficient to give an inoculated product containing on the order of $1.0 \times 10^9$ microorganisms per milliliter.

8. The process of claim 7 wherein the liquid egg white is inoculated by addition of the microbial cells in admixture with a nontoxic liquid of the group consisting of liquid egg white, water and saline.

9. The process of claim 8 wherein inoculation is effected by addition of the microbial cells in admixture with saline.

10. The process which comprises inoculating liquid egg white with a concentrated microbial cell preparation of *Streptococcus lactis* in an amount sufficient to give an inoculated product containing on the order of $1.0 \times 10^9$ microorganisms per milliliter of egg white and maintaining the inoculated egg white at a temperature of about 21°–37° C. until the glucose content thereof is reduced to at least about 0.018 percent by weight.

11. The process of claim 10 wherein the initial pH of liquid egg white is adjusted to 6.7–7.5.

12. The process of claim 10 wherein the initial pH of the liquid egg white is adjusted to 7.5–8.6.

13. The process of claim 10 wherein the liquid egg white is inoculated at its natural pH.

14. The process of claim 10 wherein the inoculated egg white is maintained at a temperature of 21°–37° C. for a length of time sufficient to reduce its glucose content to at least 0.005 percent by weight.

ARTHUR M. KAPLAN.
MATHILDE SOLOWEY.

REFERENCES CITED

The following references are of record in the file of this patent:

UNITED STATES PATENTS

| Number | Name | Date |
|---|---|---|
| 1,818,214 | Epstein et al. | Aug. 11, 1931 |
| 2,427,726 | Hopkins et al. | Sept. 23, 1947 |
| 2,465,875 | Hopkins | Mar. 29, 1949 |